US007844005B2

(12) United States Patent
Koga et al.

(10) Patent No.: US 7,844,005 B2
(45) Date of Patent: Nov. 30, 2010

(54) MULTICARRIER COMMUNICATION APPARATUS, INTEGRATED CIRCUIT, AND MULTICARRIER COMMUNICATION METHOD

(75) Inventors: Hisao Koga, Fukuoka (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 731 days.

(21) Appl. No.: 11/629,614

(22) PCT Filed: May 16, 2006

(86) PCT No.: PCT/JP2006/010090

§ 371 (c)(1),
(2), (4) Date: Dec. 15, 2006

(87) PCT Pub. No.: WO2006/123808

PCT Pub. Date: Nov. 23, 2006

(65) Prior Publication Data

US 2007/0230599 A1 Oct. 4, 2007

(30) Foreign Application Priority Data

May 16, 2005 (JP) .............................. 2005-142997

(51) Int. Cl.
*H04K 1/10* (2006.01)
(52) U.S. Cl. ..................................................... 375/260
(58) Field of Classification Search ................. 375/260, 375/222, 224; 455/402, 504; 340/310.12
See application file for complete search history.

(56) References Cited

U.S. PATENT DOCUMENTS

| | | | |
|---|---|---|---|
| 6,566,889 B2 * | 5/2003 | Warke | 324/527 |
| 6,907,044 B1 | 6/2005 | Yonge, III et al. | |
| 6,907,092 B1 * | 6/2005 | Yakhnich et al. | 375/346 |
| 7,391,714 B2 * | 6/2008 | Blasco Claret et al. | 370/208 |
| 2003/0022680 A1 * | 1/2003 | Shreve | 455/504 |
| 2005/0037722 A1 | 2/2005 | Koga et al. | |
| 2006/0250223 A1 * | 11/2006 | Koga et al. | 340/310.11 |

FOREIGN PATENT DOCUMENTS

| | | |
|---|---|---|
| DE | 101 22 698 | 11/2002 |
| JP | 10247955 | 9/1998 |
| WO | 02/23847 | 3/2002 |
| WO | 2005/076725 | 8/2005 |

OTHER PUBLICATIONS

PCT International Search Report dated Aug. 8, 2006.
R. Grunheid, et al., "A Blockwise Loading Algorithm for the Adaptive Modulation Technique in OFDM Systems," Vehicular Technology Conference, 2001. VTC 2001 Fall. IEEE VTS 54$^{th}$, vol. 2, Aug. 2001, p. 948-951, ISBN: 0/7803-7005-8.
R. Grunheid, et al., "Comparison of Different Concepts for Adaptive Modulation in OFDM Systems," 1st international OFDM-Workshop in Hamburg, Sep. 21, 1999, p. 1-16, XP008067425.

* cited by examiner

*Primary Examiner*—Khai Tran
(74) *Attorney, Agent, or Firm*—Dickinson Wright PLLC (57) ABSTRACT

Channel estimation unit 16 includes CNR calculation unit 17, threshold setting unit 18, and modulation method determination unit 19. CNR calculation unit 17 calculates a CNR for each of a plurality of subcarriers from a received multicarrier communication signal. Threshold setting unit 18 takes statistics of a plurality of calculated CNRs, and, based on the statistics, sets CNR thresholds each assigned to one of a plurality of modulation methods. Modulation method determination unit 19 uses the set thresholds to determine a modulation method for each subcarrier, according to the calculated CNR of the subcarrier.

13 Claims, 10 Drawing Sheets

MULTICARRIER COMMUNICATION APPARATUS, INTEGRATED CIRCUIT, AND MULTICARRIER COMMUNICATION METHOD

TECHNICAL FIELD

The present invention relates to a multicarrier communication apparatus, an integrated circuit, and a multicarrier communication method, in which communication is performed via a transmission line, through which a multicarrier communication signal is transmitted.

BACKGROUND ART

Conventionally, for a multicarrier communication in which a plurality of subcarriers are used for transmitting data in parallel, there has been a communication method in which a primary modulation method (in other words, "modulation scheme") is selected for each subcarrier according to a preconfigured transmission status.

In this communication method, a plurality of adaptive modulation blocks are provided for each subcarrier. A transmission status of each adaptive modulation block is divided into a plurality of levels (for example, 4 levels) according to a set of thresholds. For each level of the transmission status, an optimal primary modulation method is selected for transmission. For example, when the transmission status is above the third threshold, a signal is transmitted with 64QAM; when the transmission status is above the second threshold, a signal is transmitted with 16QAM; when the transmission status is above the first threshold, a signal is transmitted with QPSK; and when the transmission status is below the first threshold, it is treated as a dummy state and no signal is transmitted.

As described above, more data are transmitted on a subcarrier with a good transmission status, and less data are transmitted on a subcarrier with a bad transmission status, thereby making it possible to transmit a high quality signal at a high speed (for example, see Japanese Laid-Open Patent Publication H10-247955).

DISCLOSURE OF THE INVENTION

However, in the above-described conventional communication method, since fixed thresholds are used to determine a primary modulation method for each subcarrier, when considering the multicarrier communication in whole, there is a problem that the transmission rate corresponding to a transmission status is not maximized.

The embodiment examples have taken the above-described conventional problem into account, and aims to provide a multicarrier communication apparatus, an integrated circuit, and a multicarrier communication method, which perform an adaptive modulation for each subcarrier and are capable of increasing transmission rate while maintaining transmission quality.

The multicarrier communication apparatus connects to a transmission line and transmits a multicarrier communication signal that is composed of a plurality of subcarriers through the transmission line to perform multicarrier communication. The multicarrier communication apparatus includes a noise level calculator, a threshold setting unit, and a modulation method determiner. The noise level calculator calculates at least two of a plurality of noise levels for at least two of the plurality of subcarriers, respectively. The threshold setting unit calculates a statistical value corresponding to at least two of the plurality of noise levels calculated by the noise level calculator, and sets a noise level threshold based on the calculated statistical value. The modulation method determiner determines a modulation method corresponding to at least one of the plurality of subcarriers using the noise level threshold set by the threshold setting unit.

According to this configuration, the modulation methods of subcarriers are determined according to the statistics of the calculated noise levels of the plurality of subcarriers. Therefore, it is possible to increase transmission rate, while maintaining transmission quality, according to transmission status.

The integrated circuit transmits a multicarrier communication signal that is composed of a plurality of subcarriers through a transmission line to perform multicarrier communication. The integrated circuit includes a noise level calculator, a threshold setting unit, and a modulation method determiner. The noise level calculator calculates at least two of a plurality of noise levels for at least two of the plurality of subcarriers, respectively. The threshold setting unit calculates a statistical value corresponding to at least two of the plurality of noise levels calculated by the noise level calculator, and sets a noise level threshold based on the calculated statistical value. The modulation method determiner determines a modulation method corresponding to at least one of the plurality of subcarriers using the noise level threshold set by the threshold setting unit.

According to this configuration, the modulation methods of subcarriers are determined according to the statistics of the calculated noise levels of the plurality of subcarriers. Therefore, it is possible to increase transmission rate, while maintaining transmission quality, according to transmission status.

The multicarrier communication method is for transmitting a multicarrier communication signal that is composed of a plurality of subcarriers through a transmission line to perform multicarrier communication. The multicarrier communication method includes calculating at least two of a plurality of noise levels for at least two of the plurality of subcarriers, respectively; calculating a statistical value corresponding to at least two of the plurality of noise levels; setting a noise level threshold based on the statistical value; and determining a modulation method corresponding to at least one of the plurality of subcarriers using the noise level threshold.

According to this method, the modulation methods of subcarriers are determined according to the statistics of the calculated noise levels of the plurality of subcarriers. Therefore, it is possible to increase transmission rate, while maintaining transmission quality, according to transmission status.

The present invention provides a multicarrier communication apparatus, an integrated circuit, and a multicarrier communication method, which perform an adaptive modulation for each subcarrier and are capable of increasing transmission rate while maintaining transmission quality.

BEST MODE FOR CARRYING OUT THE INVENTION

Figure 1:
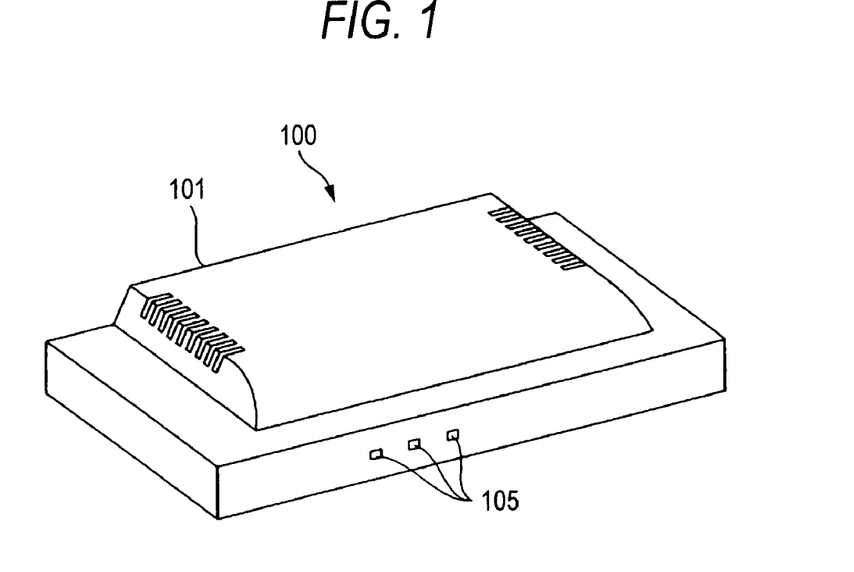
FIG. 1 is an exterior perspective view showing a front of a multicarrier communication apparatus according to an embodiment.
Figure 2:
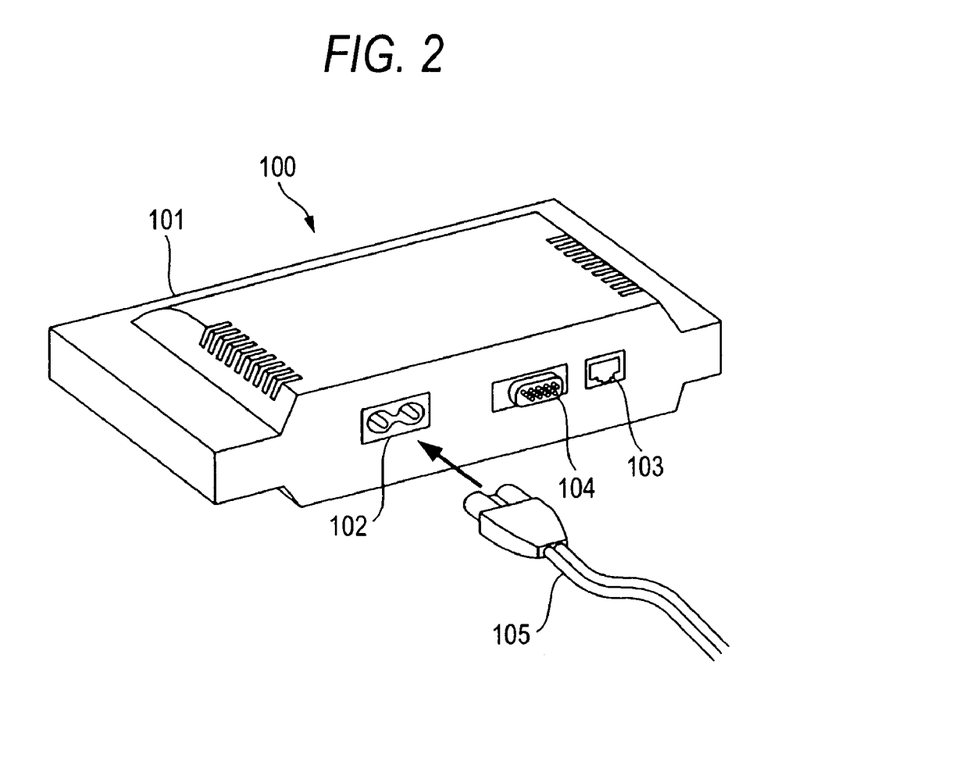
FIG. 2 is an exterior perspective view showing a back of the multicarrier communication apparatus according to the embodiment.

FIG. 1 is an exterior perspective view showing a front side of a multicarrier communication apparatus according to an embodiment. FIG. 2 is an exterior perspective view showing a back side of the multicarrier communication apparatus according to the embodiment. Multicarrier communication apparatus 100 according to the embodiment is a modem, as shown in FIGS. 1 and 2. Multicarrier communication apparatus 100 has chassis 101. On the front of chassis 101, as shown in FIG. 1, display 105 having LEDs (Light Emitting Diodes) and the like is provided. On the back of chassis 101, as shown in FIG. 2, power connector 102, modular jack 103 such as a RJ45 or the like for LAN (Local Area Network) connection, and Dsub connector 104 are provided. As shown in FIG. 2, power line 105, such as a parallel cable, is connected to power connector 102. A LAN cable, which is not shown in the figure, is connected to modular jack 103. A Dsub cable, which is not shown in the figure, is connected to Dsub connector 104. As an example of the communication apparatus, a modem is shown in FIGS. 1 and 2. However, it is not necessarily limited to this specific example; the communication apparatus can also be an electrical apparatus (for example, a household electrical appliance such as a TV set) equipped with a modem.

Figure 3:
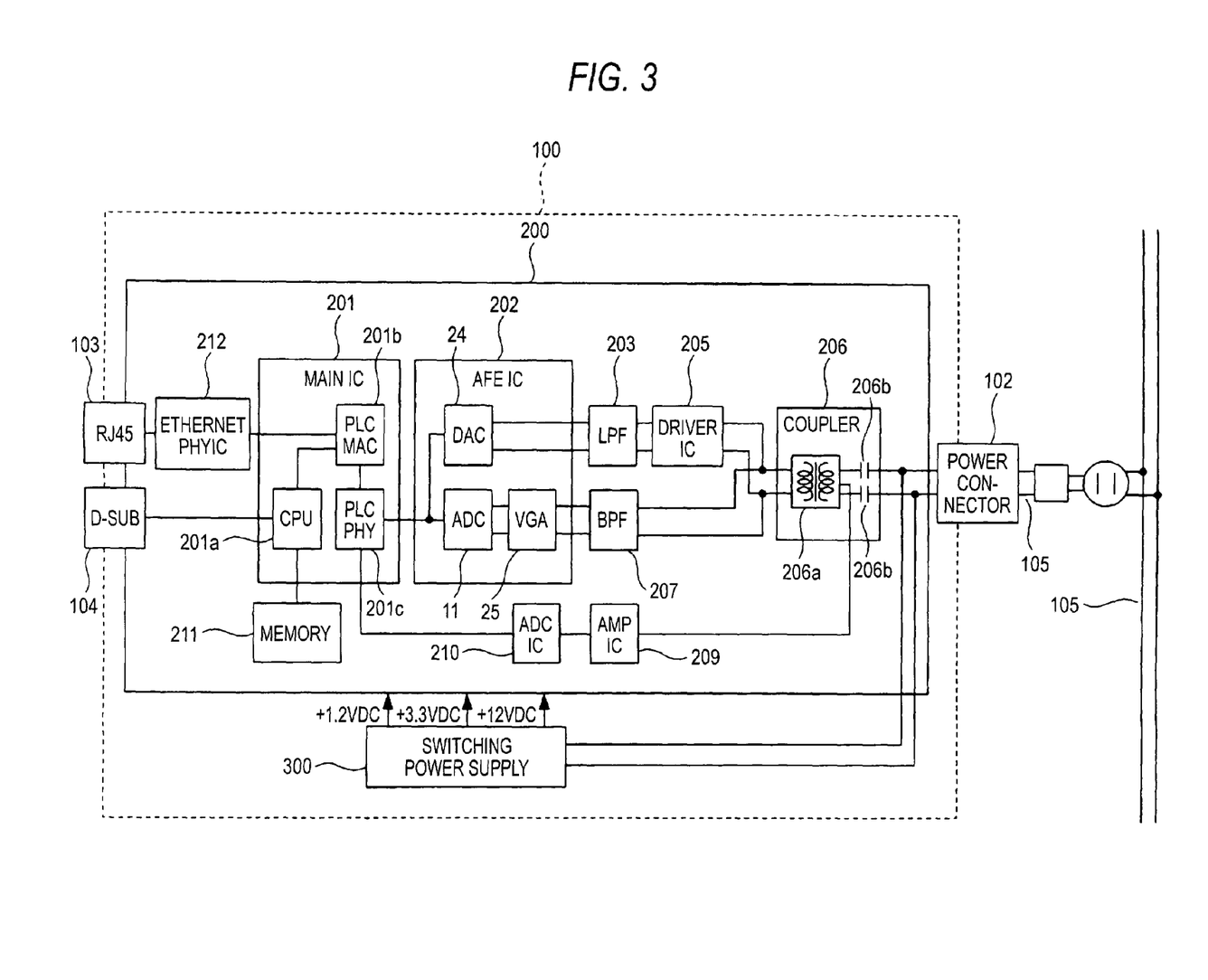
FIG. 3 is a block diagram showing an example of hardware of the multicarrier communication apparatus according to the embodiment.

FIG. 3 is a block diagram showing an example of hardware of the multicarrier communication apparatus according to the embodiment. As FIG. 3 shows, multicarrier communication apparatus 100 has circuit module 200 and power supply 300. Power supply 300 supplies +1.2V, +3.3V, and +12V voltages to circuit module 200. Circuit module 200 includes main IC (Integrated Circuit) 201, AFE IC (Analog Front End IC) 202, low-pass filter (LPF) 203, driver IC 205, coupler 206, band-pass filter (BPF) 207, AMP (amplifier) IC 209, ADC (AD Converter) IC 210, memory 211, and Ethernet (registered trademark) physical layer IC (PHY IC) 212.

Main IC 201 is an example of the integrated circuit, and includes CPU (Central Processing Unit) 201a, PLC MAC (Power Line Communication Media Access Control) block 201b and PLC PHY (Power Line Communication Physical layer) block 201c. AFE IC 202 includes D/A converter (DAC) 24, A/D converter (ADC) 11, and variable gain amplifier (VGA) 25. Coupler 206 includes coil transformer 206a and capacitors 206b.

Figure 4:
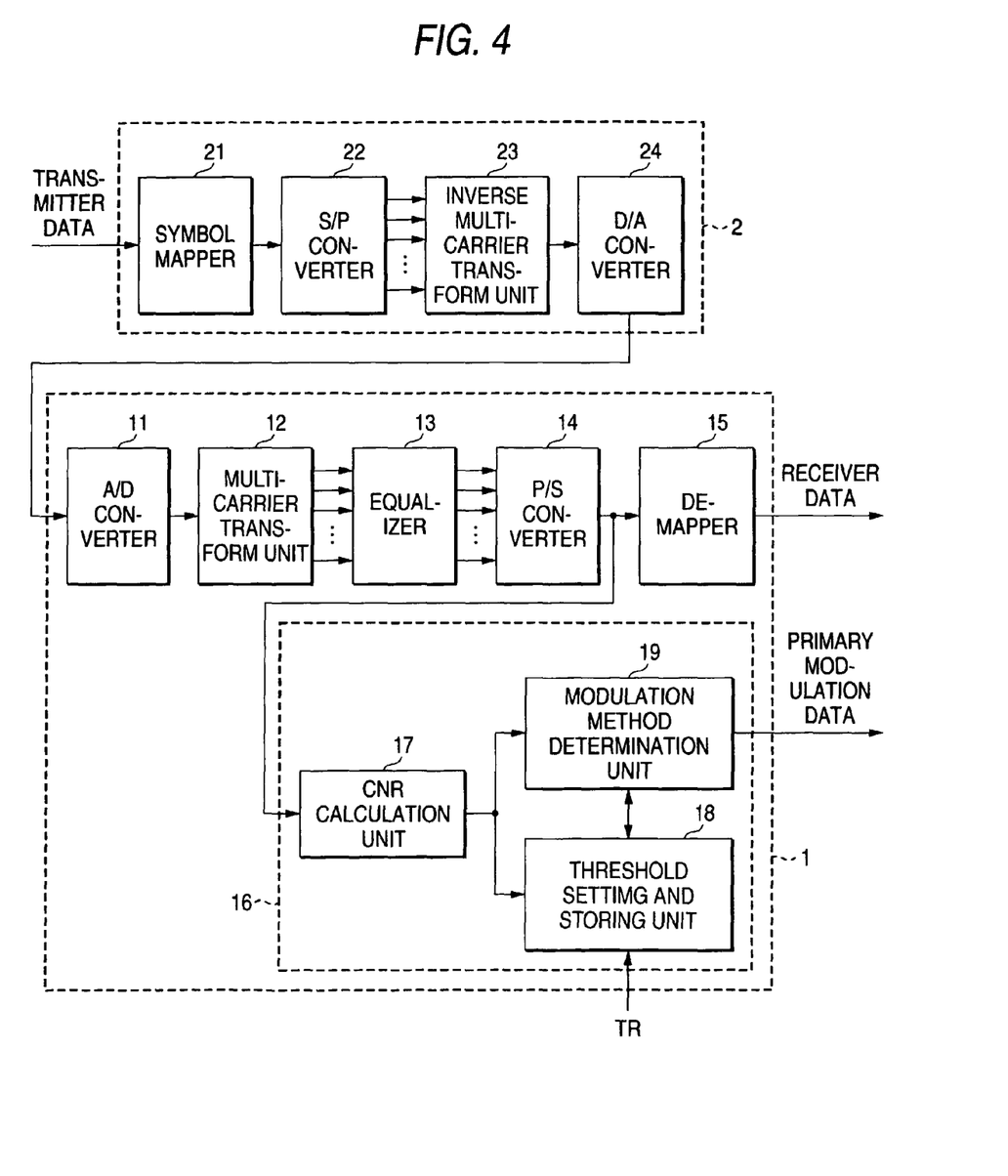
FIG. 4 is a block diagram showing a schematic configuration of the multicarrier communication apparatus according to the embodiment.

FIG. 4 is a block diagram showing a schematic configuration of the multicarrier communication apparatus according to the embodiment.

In FIG. 4, receiver 1 includes A/D converter 11, multicarrier transform unit 12, equalizer 13, P/S converter 14, demapper 15 and channel estimation unit 16. Multicarrier transform unit 12, such as a Fast Fourier transform (FFT) or a Discrete Wavelet Transform (DWT) or the like, performs a desired time-frequency transform. Equalizer 13 corrects a received signal so as to cancel influence of a transmission line. P/S converter 14 converts parallel data to serial data. Demapper 15 converts mapped symbol data to bit data of a receiver signal. Channel estimation unit 16 determines a primary modulation method to be used for each subcarrier, based on a noise level of a receiver signal. PLC MAC block 201b of main IC 201 shown in FIG. 3 includes above-mentioned multicarrier transform unit 12, equalizer 13, P/S converter 14, demapper 15 and channel estimation unit 16.

Channel estimation unit 16 includes CNR calculation unit 17, threshold setting and storing unit 18, and modulation method determination unit 19. CNR calculation unit 17 calculates a carrier to noise ratio (referred to as CNR hereafter), as one example of a noise level of a receiver signal, for each of subcarriers being used. Threshold setting and storing unit 18 takes statistics of a plurality of noise level values calculated by CNR calculation unit 17; based on the statistics, sets noise level thresholds each assigned to one of a plurality of modulation methods; and then maintains the set thresholds. Modulation method determination unit 19 uses the set thresholds to determine a modulation method for each subcarrier, according to the calculated noise level for the subcarrier.

Transmitter 2 includes symbol mapper 21, S/P converter 22, inverse multicarrier transform unit 23 and D/A converter 24. Symbol mapper 21 performs symbol mapping to convert bit data of a transmitted signal, to symbol data. S/P converter 22 converts serial data to parallel data. Inverse multicarrier transform unit 23, such as an Inverse Fast Fourier transform (IFFT) or an Inverse Wavelet Transform (IWT) or the like, performs a desired frequency-time transform. PLC MAC block 201b of main IC 201 shown in FIG. 3 includes above-mentioned symbol mapper 21, S/P converter 22 and inverse multicarrier transform unit 23, shown in FIG. 4.

Receiver 1 and transmitter 2 both are in a form of the communication apparatus shown in FIGS. 1-3. However, it is also possible that receiver 1 is configured to have only a receiver functionality, and transmitter 2 is configured to have only a transmitter functionality.

Operations of so configured communication apparatuses are explained in the following.

At transmitter 2, symbol mapper 21 converts bit data which are to be transmitted (transmitter data) to symbol data, and performs symbol mapping (a modulation such as PAM, QAM and the like) on a complex coordinate plane, according to each symbol data. The transmitter data are transmitted from PLC MAC block 201b. Then, S/P converter 22 gives a real value for each subcarrier, and inverse multicarrier transform unit 23 transforms them to a discrete multicarrier signal. Thereby, sample values of a time axis wave pattern are generated, and a series of sample values representing transmission symbols are generated. Next, after a serial conversion is performed by a P/S converter, which is not shown in the figure, D/A converter 24 generates a transmitter signal of a base-band analog signal wave pattern, which is continuous in time.

At receiver 1, A/D converter 11 performs a sampling of an analog signal received via a transmission line, such as power line 105, at the same sample rate as transmitter 2, and converts the analog signal to a digital base-band signal. An S/P converter, which is not shown in the figure, converts the digital base-band signal to a series of parallel sample values. Then, the series of sample values are input into multicarrier transform unit 12, and transformed to a discrete multicarrier signal on a frequency axis while being synchronized with a receiver signal by a synchronization circuit, which is not shown in the figure. The discrete multicarrier signal is equalized by equalizer 13, which compares the discrete multicarrier signal with pre-assigned known data to obtain an equalization quantity. Thereafter, P/S converter 14 converts the equalized discrete multicarrier signal to a serial signal, and demapper 15 performs a process (demodulation), which is an inverse of the process performed by symbol mapper 21, to obtain receiver data. The receiver data are transmitted to PLC MAC block 201*b*.

Figure 5:
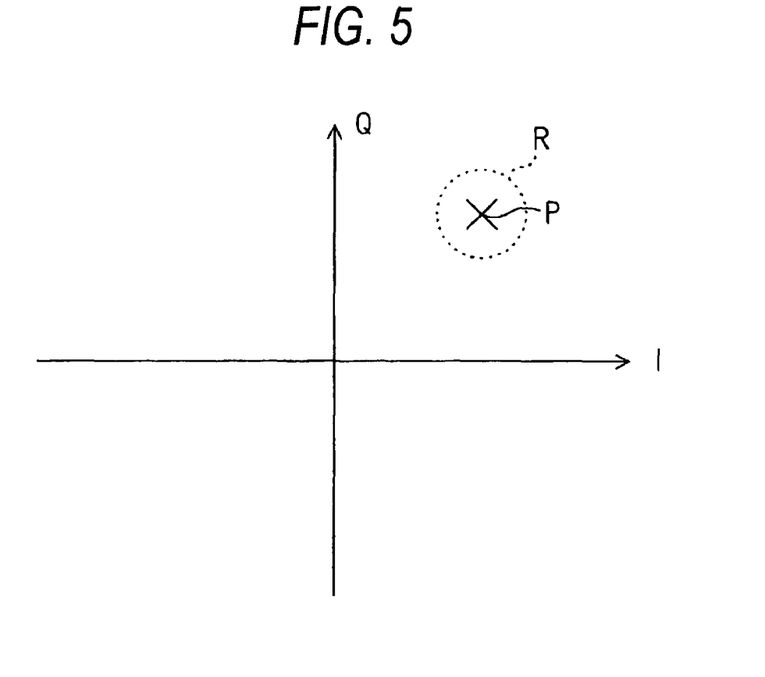
FIG. 5 is a schematic diagram for explaining a principle of a CNR calculation of the communication apparatus according to the embodiment.
Figure 6:
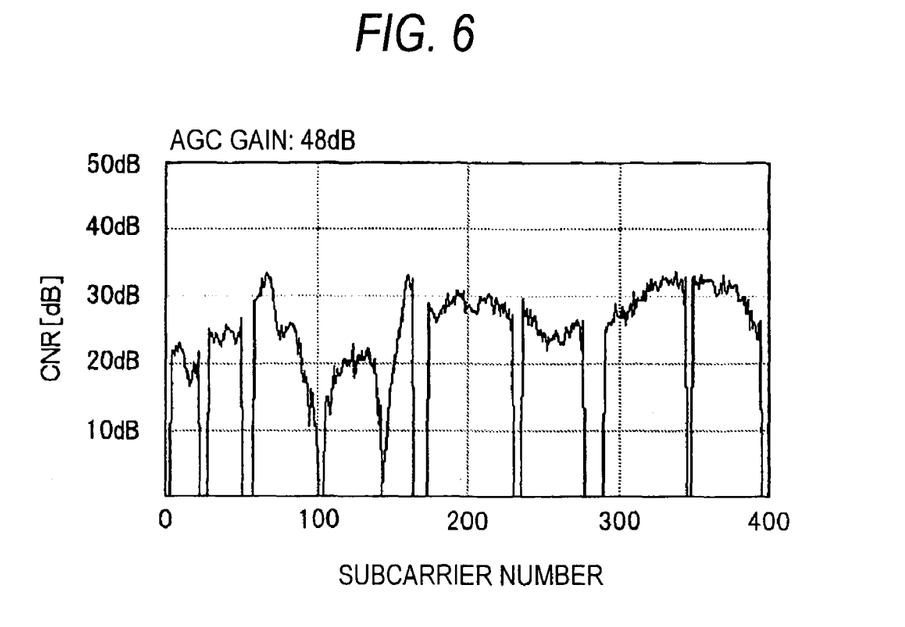
FIG. 6 shows CNR characteristics for each of subcarriers obtained by a channel estimation unit.

Further, in channel estimation unit 16, CNR calculation unit 17 calculates a CNR for each subcarrier, based on the output from P/S converter 14. FIG. 5 is a schematic diagram for explaining a principle of CNR calculation of the communication apparatus according to the embodiment. For example, as schematically shown in FIG. 5, a squared value of a distance between known signal point P of I and Q components of orthogonal vector and an actual reception point R, which is deviated because of a noise or the like, is taken as a noise level, and a CNR is obtained by calculating a power ratio of the noise level and the carrier. It is also possible to similarly calculate a CNR by using a signal that has been determined by using a signal output from equalizer 13 as a substitute for the known signal. FIG. 6 shows CNR characteristics for each of the subcarriers obtained through channel estimation. By doing so, a calculated CNR can be obtained for each subcarrier.

Figure 7:
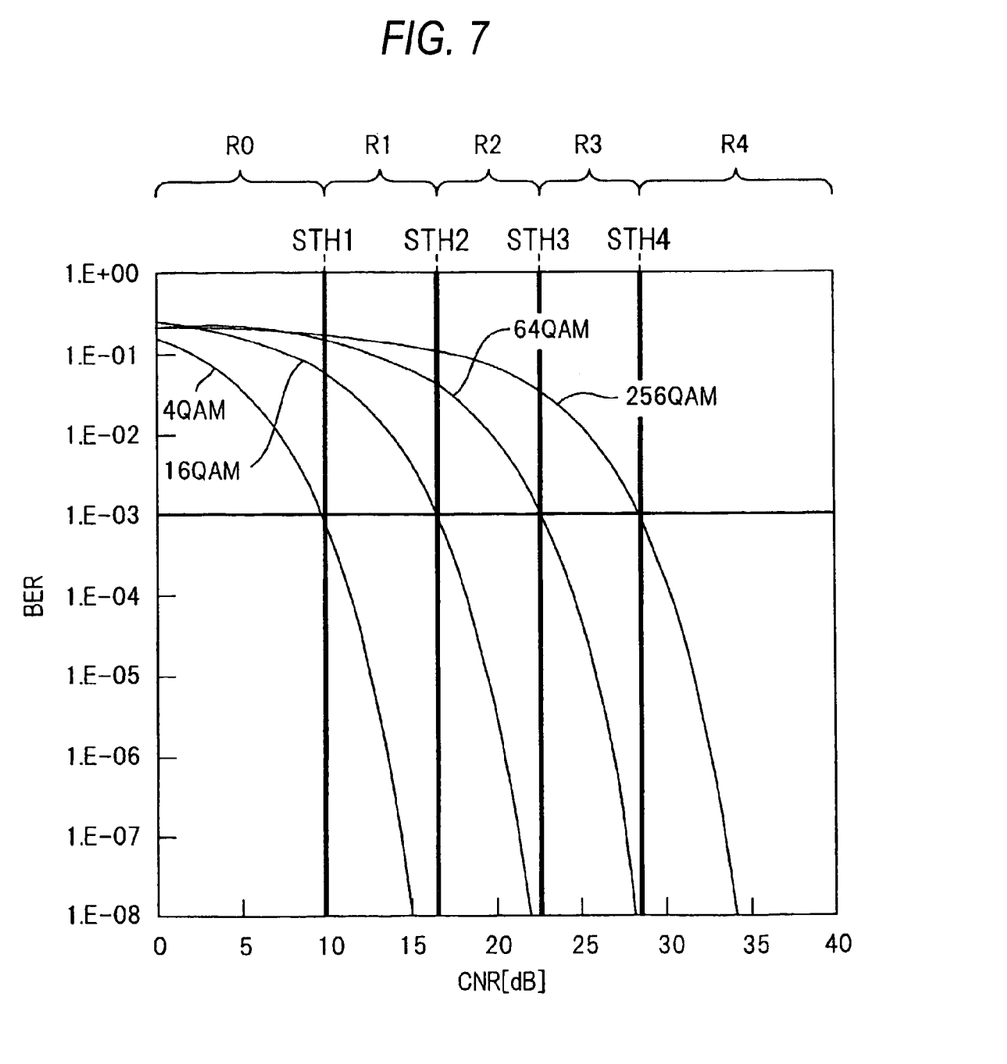
FIG. 7 explains a method for setting a BER characteristic for a CNR and an initial threshold of the CNR.

The following describes an adaptive modulation in which a modulation method is selected according a calculated CNR. FIG. 7 explains a method for setting a bit error rate (referred to as BER hereafter) characteristic for a CNR and an initial threshold of the CNR. In FIG. 7, values noted on the scale of the vertical BER axis indicate powers of 10, such as, for example, "1.E−04" indicates "$1 \times 10^{-4}$." Further, the embodiment describes a case where, as a plurality of primary modulation methods, four options, which are, in order from low to high transmission efficiency, 4QAM, 16QAM, 64QAM and 256QAM, are selectable.

As FIG. 7 shows, each primary modulation method has a different BER characteristic for a CNR. For all of the primary modulation methods, there is a tendency that a BER is higher (there are more errors in receiver data) for a lower CNR (a worse noise characteristic). However, for a modulation method with a low transmission efficiency, a good BER can be obtained for a low CNR. In other words, noise characteristics and transmission efficiency are in an opposite relation.

In the present embodiment, a BER required to maintain a transmission quality (referred to as a desired BER hereafter) is below $1 \times 10^{-3}$. CNR thresholds (initial thresholds) STH1-STH4 of the respective modulation methods for satisfying the desired BER are shown in FIG. 7. That is, in order to have a BER below $1 \times 10^{-3}$, it is necessary to have a CNR that is above threshold STH1 for 4QAM, above threshold STH2 for 16QAM, above threshold STH3 for 64QAM, and above threshold STH4 for 256QAM.

More specifically, as a primary modulation method, 4QAM can be assigned to a subcarrier with a CNR in region R1 (STH1≦CNR≦STH2); 16QAM can be assigned to a subcarrier with a CNR in region R2 (STH2≦CNR≦STH3); 64QAM can be assigned to a subcarrier with a CNR in region R3 (STH3≦CNR≦STH4); and 256QAM can be assigned to a subcarrier with a CNR in region R4 (STH4≦CNR). Thereby, a modulation method of good transmission efficiency can be selected for each subcarrier to satisfy the desired BER according to its CNR.

Therefore, it is possible to select a primary modulation method with a higher transmission rate, such as 256QAM, for a subcarrier with a good CNR, and to select a primary modulation method with a low transmission rate, such as 4QAM, for a subcarrier with a bad CNR, and thus improving the efficiency of an overall transmission rate. Region R0 (0≦CNR≦STH1) is a region where the desired BER cannot be satisfied by any of the modulation methods.

The above-describe method, which uses CNR thresholds STH1-STH4 each fixed for one of the modulation methods to determine a primary modulation method, ensures that the desired BER is satisfied in each of the regions, regardless of distribution of subcarrier CNRs. However, it is possible that an average of the subcarrier BERs, each obtained by a modulation method determined according to STH1-STH4, may be far below the desired BER of $1 \times 10^{-3}$.

Figure 8:
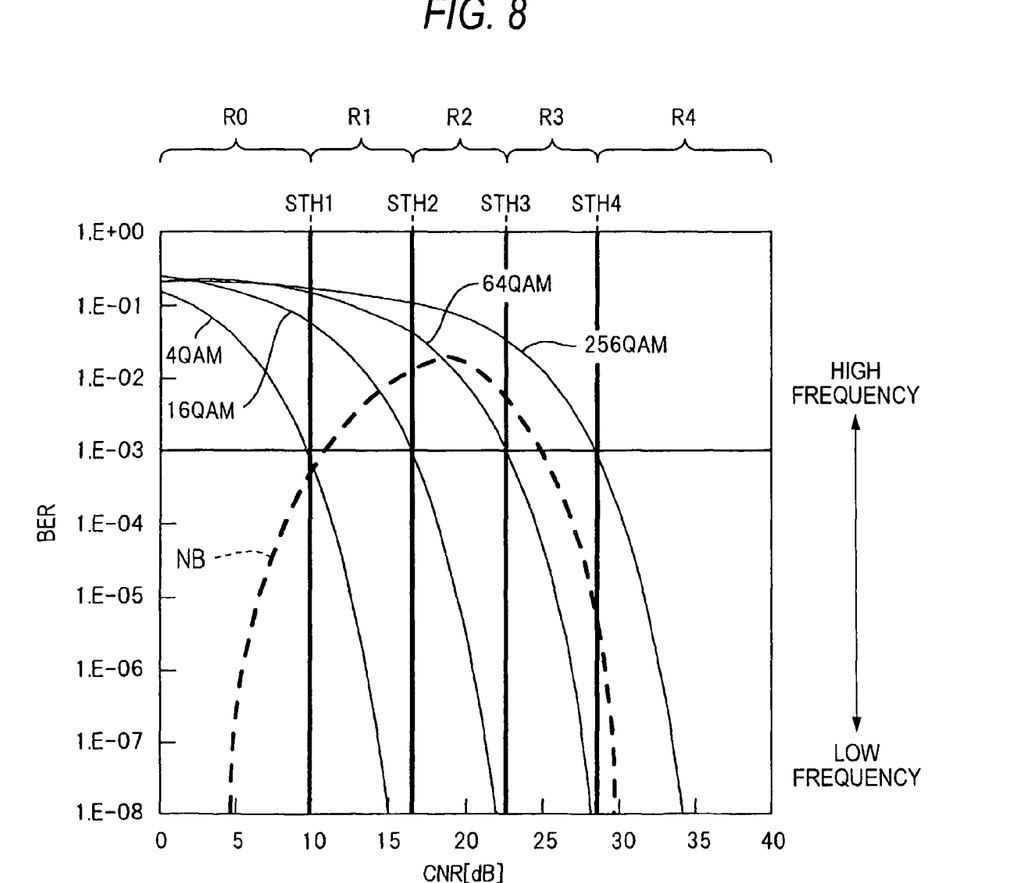
FIG. 8 shows a distribution of the number of subcarriers according to their CNRs.

FIG. 8 shows a distribution of number of subcarriers according to their CNRs. FIG. 8 is a result of adding CNR distribution characteristic NB (the broken line), which shows the number of subcarriers of a calculated CNR (hereafter referred to as CNR frequency), to FIG. 7, which shows a BER characteristic for a CNR for each of the primary modulation methods. As FIG. 8 shows, distribution characteristic NB increases as CNR increases in regions R0 and R1, whereas distribution characteristic NB decreases as CNR increases in regions R3 and R4.

When CNR distribution characteristic NB is compared with thresholds STH1-STH4, it is clear that, for example, in region R1, a CNR frequency near STH2 is higher than a CNR frequency near STH1. In other words, frequency of a BER, which is much lower than the desired BER ($1 \times 10^{-3}$), is higher. Therefore, it is expected that an average of BERs of subcarriers in region R1, to which the modulation method (4QAM) is applied, is much lower than the desired BER.

As described above, although the desired BER is ensured by creating regions R0-R4 according to thresholds STH1-STH4 and selecting a suitable modulation method for a subcarrier, it is possible that the overall BER of subcarriers used for communication is much lower than the desired BER. In other words, for example, in region R1, since modulation method 4QAM is selected near STH2, transmission rate is reduced accordingly. To address this problem, the channel estimation unit of the present embodiment takes into account an overall CNR of the subcarriers being used and determines a primary modulation method for each subcarrier so as to collectively satisfy the desired BER, thereby increasing the transmission rate while ensuring the desired BER.

Figure 9:
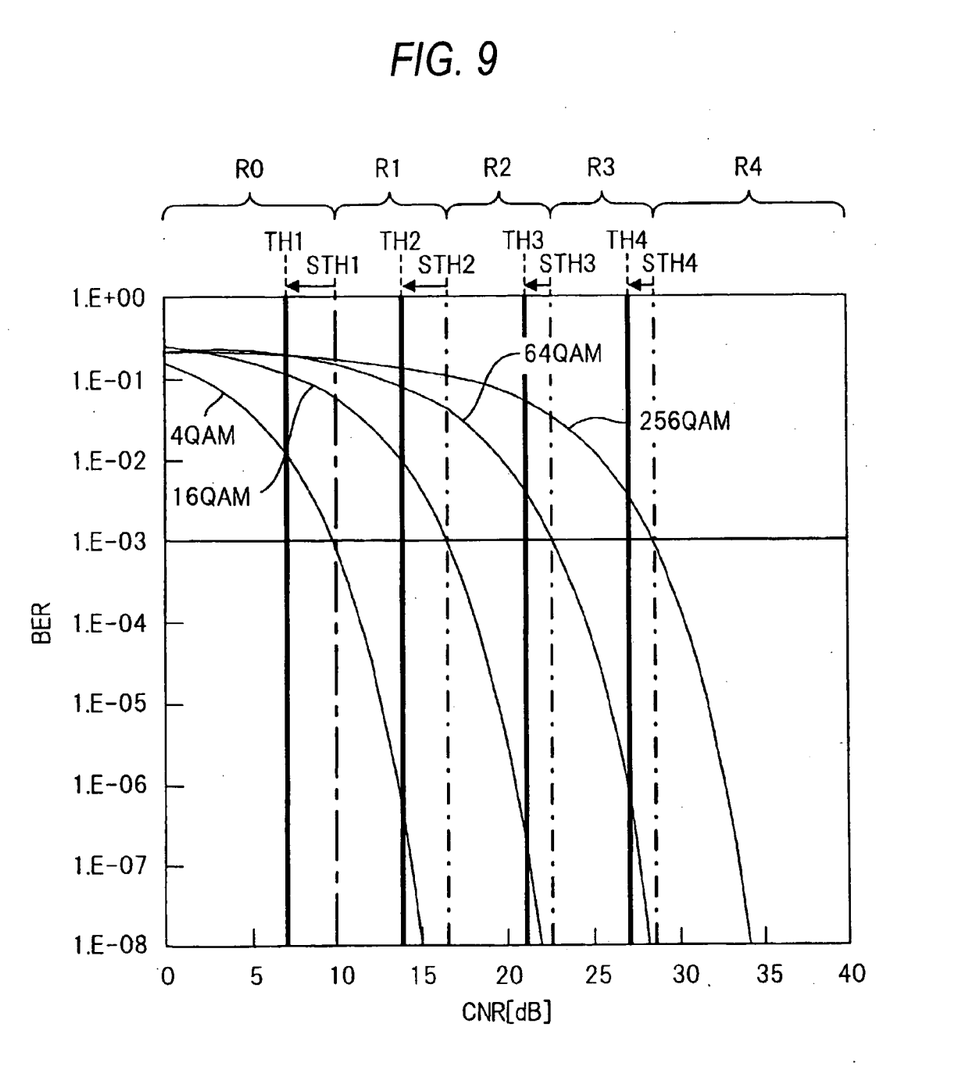
FIG. 9 explains a method of setting CNR thresholds according to the present embodiment.

A method for setting a CNR threshold for each modulation method by threshold setting and storing unit 18 will be described in the following by using a concrete example. FIG. 9 explains the method of setting CNR thresholds according to the present embodiment.

Threshold setting and storing unit 18 first creates CNR distribution characteristic NB as a plurality of statistical values as shown in FIG. 8, from subcarrier CNR characteristics as shown in FIG. 6, according to subcarrier CNRs calculated by CNR calculation unit 17.

Threshold setting and storing unit 18 then calculates an average BER for each of the regions according to FIG. 8. A method of calculation is explained by using region R1 as an example. As already described, 4QAM is selected as the primary modulation method in region R1. A BER is obtained for each CNR value, according to the curve. Next, a weighted average is calculated for the BERs by using the CNR frequencies previously obtained from CNR distribution characteristic NB as weights. The weighted average is used as an average BER for region R1.

It is obvious that the average BER so obtained is much lower than the desired BER of $1\times10^{-3}$, as can be seen from the shape of CNR distribution characteristic in region R1, and the difference is too large. Therefore, in the present embodiment, the CNR threshold for determining the primary modulation method is modified by shifting it toward the left so as to make the obtained average BER close or equal to the desired BER of $1\times10^{-3}$.

For other regions, average BERs are similarly obtained, and each of the regions is shifted toward the left so as to make its average BER close or equal to the desired BER of $1\times10^{-3}$. Thereby, more subcarriers are assigned modulation methods of high transmission efficiency, and thus increasing the transmission rate.

Practically, changes in the thresholds are calculated according to the differences each between one of the average BERs of the modulation methods determined according to initial thresholds STH1-STH4 and the desired BER, and the changes are added to initial thresholds STH1-STH4 respectively. In other words, as FIG. 9 shows, the thresholds for determining modulation methods are shifted toward the left, from initial thresholds STH1-STH4 to thresholds TH1-TH4.

In region R1, as FIG. 8 shows, since CNR distribution characteristic NB is increasing, the difference between the average BER and the desired BER is large, which leads to the large change added to initial threshold STH1. In regions R3 and R4, since CNR distribution characteristic NB is decreasing, the difference between each of the average BERs and the desired BER is small, which leads to the small changes added to initial thresholds STH3 and STH4.

The changes added to initial thresholds STH1-STH4 for obtaining thresholds TH1-TH4 may be obtained from a table, in which differences each between one of the average BERs and the desired BER and their corresponding changes are stored in advance, or may also be obtained from the calculated differences according to a predetermined calculation formula.

Further, shifting the thresholds (changing the regions) may be performed only once by predicting an average BER close or equal to $1\times10^{-3}$. It may also be performed by repeating a fine adjustment process until the average BER nearly converges to $1\times10^{-3}$, that is, the average BER is within a predetermined range.

In the above description, the thresholds are set by obtaining the average BERs. However, it is also possible to simply calculate an average CNR for each of the regions from the CNR distribution characteristic, obtain a BER corresponding to the average CNR by using the curve of the primary modulation method selected for the region, and use the BER as the average BER. Then, changes to be added to the initial thresholds STH1-STH4 are obtained from the differences between the average BERs and the desired BER. It is also possible to obtain the changes by comparing the average CNRs with initial thresholds STH1-STH4, without obtaining BERs.

Figure 10:
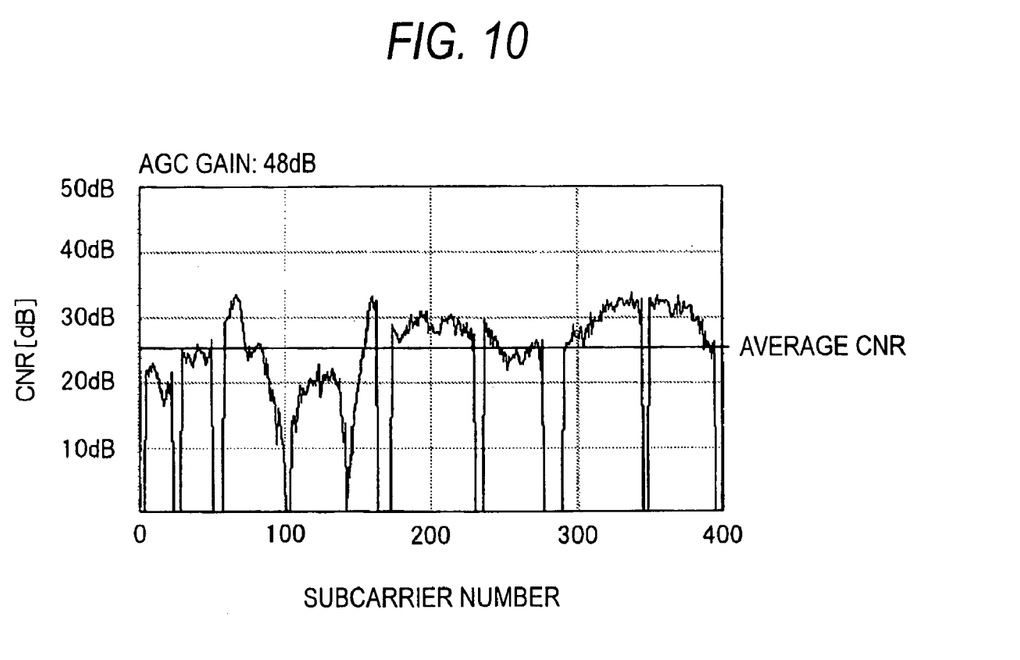
FIG. 10 shows a calculated average CNR of all subcarriers.

The average CNR in the above description, as already described, is a weighted average using the frequencies of the CNR values obtained from CNR distribution characteristic NB for each region as the weights. In the present embodiment, a simple arithmetic average over CNRs obtained for all subcarriers in a communication is called an overall average CNR, to distinguish it from the above-mentioned weighted average. FIG. 10 shows a calculated average CNR of all subcarriers (overall average CNR).

It is desirable that the modifications of the thresholds are so determined as to make the average BERs each obtained for one of the regions close or equal to the desired BER, as described above. However, it increases the amount of computation. Therefore, a method can be considered for setting the thresholds by estimating an average BER in each region by using only a characteristic shape of the CNR distribution characteristic curve and values that can be simply obtained.

FIGS. 11A-11D describe simple methods for setting CNR thresholds according to the present embodiment. In a method shown in FIG. 11A, threshold setting and storing unit 18 sets thresholds TH1-TH4 according to only a calculated overall average CNR. In this case, thresholds TH1-TH4 may be obtained from a table, which stores an overall average CNR value and the corresponding thresholds TH1-TH4 (or the changes from initial thresholds STH1-STH4), and may also be obtained from a calculated overall average CNR according to a predetermined calculation formula. Since, as statistics of a plurality of calculated CNR values, only the overall average CNR is used, the thresholds can be easily set.

Figure 11A:
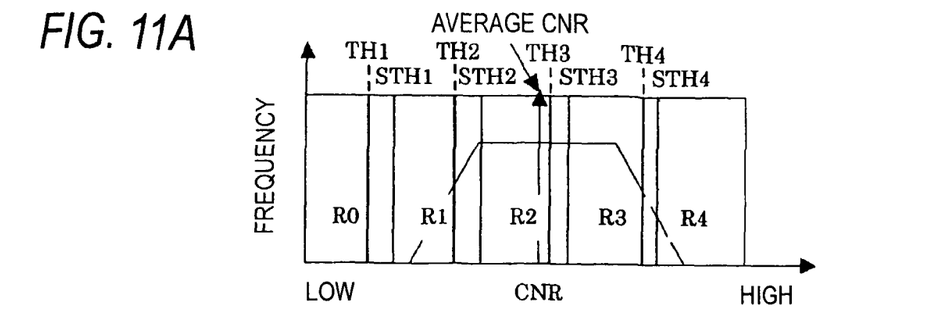
FIGS. 11A-11D describe simple methods for setting CNR thresholds according to the present embodiment.
Figure 11B:
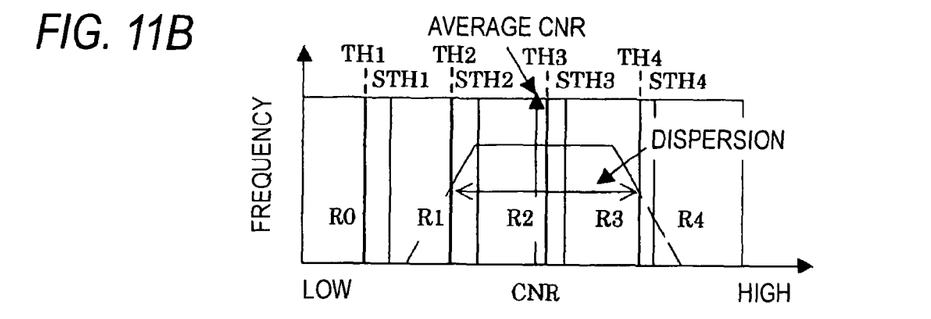

In a method shown in FIG. 11B, threshold setting and storing unit 18 sets thresholds TH1-TH4 according to a calculated statistical value such as overall average CNR, a variation (for example, a variance, a deviation) of the CNR distribution characteristic and combination of them. Since the variation is used additionally, compared to the method of FIG. 11A, more suitable thresholds can be obtained.

Figure 11C:
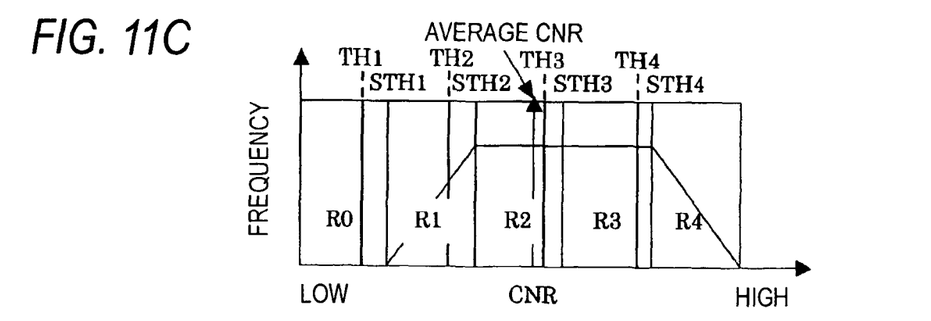

In a method shown in FIG. 11C, thresholds TH1-TH4 may be modified or set according to a characteristic shape in each region, for example, increasing in region R1, flat in regions R2 and R3, and decreasing in region R4, that is, according to changes of CNR frequencies in the regions.

Figure 11D:
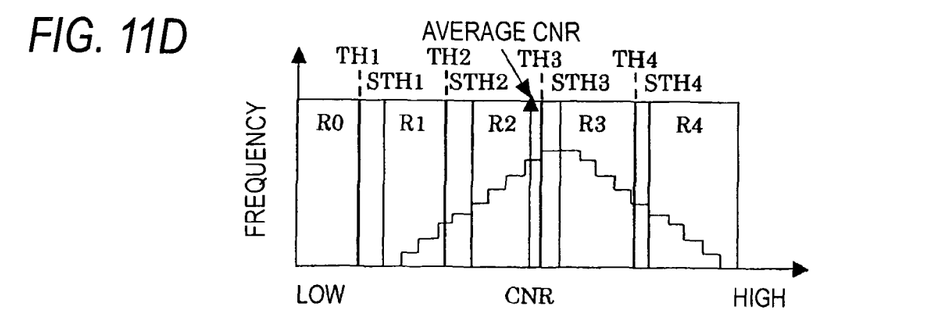

Further, as shown in FIG. 11D, it is also possible to make a histogram by using the number of subcarriers of calculated CNRs in each predetermined range of CNR as a frequency, thereby reducing the amount of computation thereafter for calculating the average BER, average CNR, overall average CNR and the like.

The above-described threshold setting process may be performed before a communication between communication apparatuses, and may also be performed during the communication. Further, thresholds may be determined during one CNR calculation (channel estimation) period. Threshold setting may also be repeated by using the once calculated CNR values to increase accuracy. Of course, it is also possible to perform a plurality of CNR calculations and modify the CNR thresholds after calculating average CNR and average BER for each CNR calculation.

Figure 12:
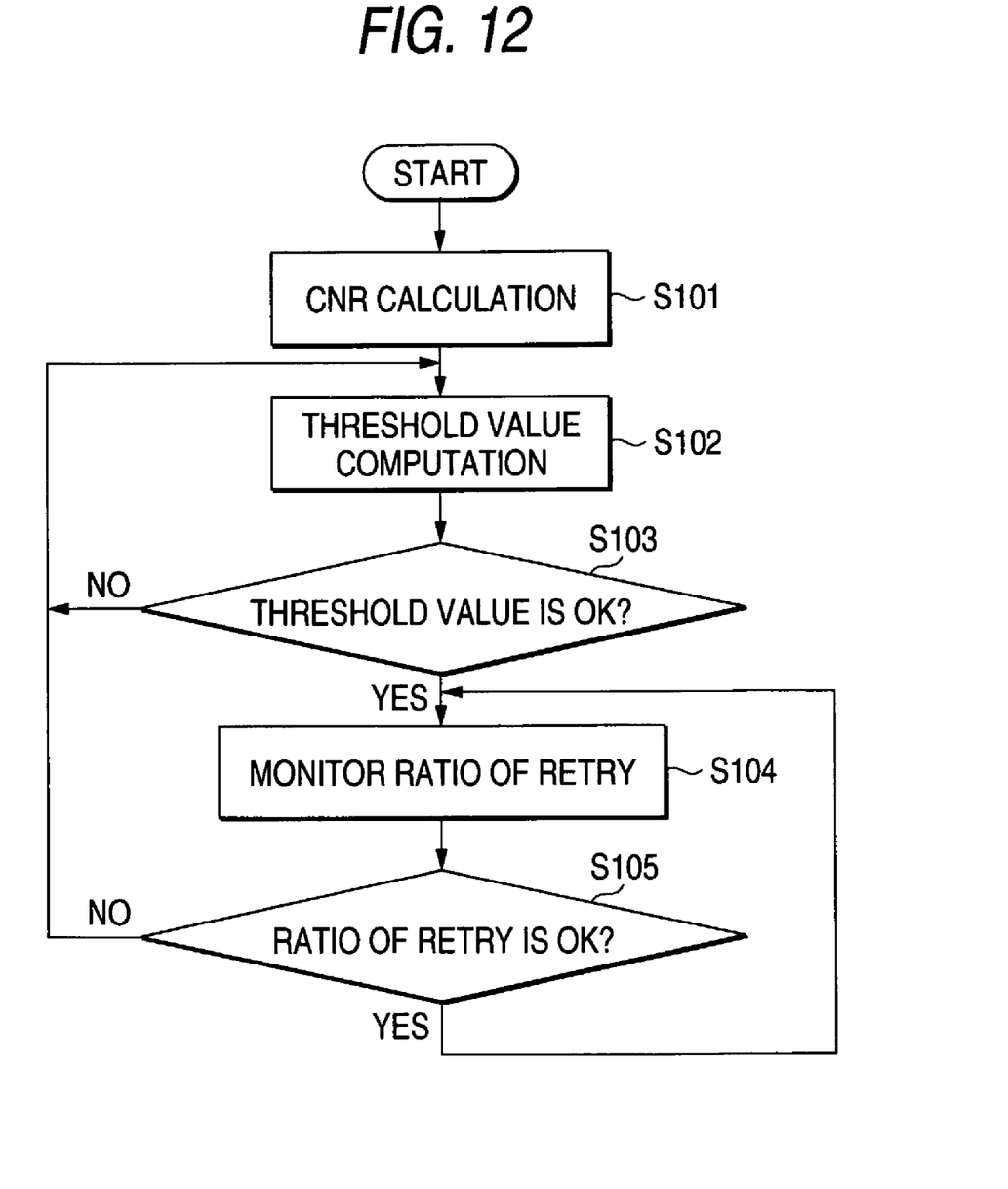
FIG. 12 is a flowchart for describing CNR threshold setting procedures when performing a retry control.

When performing retry control between communication apparatuses, by monitoring a ratio of retry on a regular basis, it is possible to set the thresholds according to the ratio of retry. In the following, procedures for setting the thresholds based on monitoring of the ratio of retry is described by using a flowchart. FIG. 12 is the flowchart for describing the CNR threshold setting procedures when performing the retry control.

First, in step S101, CNR calculation unit 17 shown in FIG. 4 calculates a CNR for each subcarrier. Next, channel estimation unit 16 calculates CNR thresholds for determining primary modulation methods by using one of the above described methods (step S102), and determines whether targeted CNR thresholds are obtained (step S103).

When the targeted CNR thresholds are not obtained, as a result determined in step S103, the process returns to the procedure of step S102, and the thresholds are recalculated.

On the other hand, when the targeted CNR thresholds are obtained in step S103, the process continues to monitor a ratio of retry during a communication (step S104), and determines whether the ratio of retry is below a predetermined value (step S105).

When the ratio of retry is below the predetermined value, as a result determined in step S105, the process returns to the procedure of step S104, and ratio of retry monitoring continues. On the other hand, when the ratio of retry is above the predetermined value, the process returns to the procedure of step S102, the CNR thresholds are recalculated, and the procedures of step S103 and thereafter are repeated.

Thus, the CNR thresholds are calculated so as to make the ratio of retry always below the predetermined value. In other words, when the ratio of retry is above the predetermined value, it is used as trigger TR (see FIG. 4) by threshold setting and storing unit 18 to perform a threshold setting process; and modulation method determination unit 19 determines accordingly the most suitable primary modulation methods, thereby enabling a suitable response when an unexpected change occurs in the transmission status, such as when noises due to operations of electrical apparatuses connected to the power lines increase largely during power line communication, and making it possible to maintain the maximum transmission rate.

In the present embodiment, by monitoring the ratio of retry, the CNR thresholds are modified so as to make the value of the ratio of retry always below the predetermined value. However, other than the ratio of retry, it is possible to use BER-related transmission quality evaluation parameters, error frequency of demodulated reception data or a value related to the error frequency of demodulated reception data. For example, BER itself, block error rate, packet error rate, and the like can be used.

As described above, according to the communication apparatus of the embodiment, the CNR calculation unit of the receiver calculates a CNR for each subcarrier; the channel estimation unit creates a CNR distribution characteristic, obtains an average BER by calculating an average CNR for each of a plurality of regions partitioned according to the thresholds for determining primary modulation methods, shifts the CNR thresholds so that the average BER is close or equal to a desired BER, and determines the primary modulation methods according to the shifted CNR thresholds. Thereby, it is possible to maximize a transmission rate while maintaining transmission quality.

INDUSTRIAL APPLICABILITY

The multicarrier communication apparatus and multicarrier communication method of the present invention have an advantage of being capable of increasing transmission rate while maintaining transmission quality, and are useful as a power line communication apparatus and the like.

The invention claimed is:

1. A multicarrier communication apparatus being capable of connecting to a transmission line and transmitting a multicarrier communication signal that is composed of a plurality of subcarriers through the transmission line to perform multicarrier communication, the multicarrier communication apparatus comprising:
   a noise level calculator that calculates at least two of a plurality of noise levels for at least two subcarriers of the plurality of subcarriers, respectively, said at least two subcarriers being of different frequencies;
   a threshold setting unit that calculates a statistical value corresponding to at least two of the plurality of noise levels calculated by the noise level calculator, and sets a noise level threshold based on the calculated statistical value; and
   a modulation method determiner that determines a modulation method corresponding to at least one of the plurality of subcarriers using the noise level threshold set by the threshold setting unit.

2. The multicarrier communication apparatus according to claim 1, wherein the threshold setting unit stores an initial threshold, and sets the noise level threshold by adding predetermined change, which is obtained based on the statistical value, to the initial threshold.

3. The multicarrier communication apparatus according to claim 2, wherein the threshold setting unit calculates a weighted average of bit error rates respectively associated with the plurality of noise levels, and sets the noise level threshold by obtaining the predetermined change based on a difference between the weighted average of the bit error rates and the predetermined bit error rate.

4. The multicarrier communication apparatus according to claim 2, wherein the threshold setting unit calculates a weighted average of the plurality of noise levels and sets the noise level threshold by obtaining the predetermined change based on the weighted average of the plurality of noise levels.

5. The multicarrier communication apparatus according to claim 3, wherein the threshold setting unit calculates the weighted average for the noise level threshold, to which the predetermined change has been added, and repeats calculating the predetermined change and setting the noise level threshold until the weighted average falls within a predetermined range.

6. The multicarrier communication apparatus according to claim 1, wherein the threshold setting unit calculates an average of the plurality of noise levels, and sets the noise level threshold based on the average.

7. The multicarrier communication apparatus according to claim 1, wherein the threshold setting unit calculates an average and a variation of the plurality of noise levels, and sets the noise level threshold based on the average and the variation.

8. The multicarrier communication apparatus according to claim 1, wherein the threshold setting unit obtains a distribution characteristic of the plurality of subcarriers respectively associated with the plurality of noise levels, and sets the noise level thresholds based on the distribution characteristic.

9. The multicarrier communication apparatus according to claim 1, wherein the threshold setting unit calculates the statistical value of the plurality of noise levels within each predetermined range, based on a histogram which uses the number of the plurality of subcarriers on which noise level are calculated as a frequency.

10. The multicarrier communication apparatus according to claim 1, wherein the threshold setting unit sets the noise level threshold according to an error frequency in reception data or a value related to the error frequency, the reception data being demodulated from the multicarrier communication signal.

11. A multicarrier communication apparatus according to claim 1, further comprising a multicarrier transform unit that transforms a signal received via the transmission line into at least two of the plurality of subcarriers,
   wherein the noise level calculator calculates said at least two of a plurality of noise levels based on at least two of the plurality of subcarriers transformed by the multicarrier transform unit.

12. An integrated circuit transmitting a multicarrier communication signal that is composed of a plurality of subcarriers through a transmission line to perform multicarrier communication, the integrated circuit comprising: a noise level calculator that calculates at least two of a plurality of noise levels for at least two subcarriers of the plurality of subcarriers, respectively, said at least two subcarriers being of different frequencies; a threshold setting unit that calculates a statistical value corresponding to at least two of the plurality of noise levels calculated by the noise level calculator, and sets a noise level threshold based on the calculated statistical value; and a modulation method determiner that determines a modulation method corresponding to at least one of the plurality of subcarriers using the noise level threshold set by the threshold setting unit.

13. A multicarrier communication method for transmitting a multicarrier communication signal that is composed of a plurality of subcarriers through a transmission line to perform multicarrier communication, the multicarrier communication method comprising: calculating at least two of a plurality of noise levels for at least two subcarriers of the plurality of subcarriers, respectively, said at least two subcarriers being of different frequencies; calculating a statistical value corresponding to at least two of the plurality of noise levels; setting a noise level threshold based on the statistical value; and determining a modulation method corresponding to at least one of the plurality of subcarriers using the noise level threshold.

* * * * *